United States Patent
Sato et al.

(10) Patent No.: US 9,969,873 B2
(45) Date of Patent: May 15, 2018

(54) PNEUMATIC TIRE

(71) Applicant: The Yokohama Rubber Co., Ltd., Tokyo (JP)

(72) Inventors: Shun Sato, Hiratsuka (JP); Kazuya Furukawa, Osaka (JP)

(73) Assignee: THE YOKOHAMA RUBBER CO., LTD., Tokyo (JP)

( * ) Notice: Subject to any disclaimer, the term of this patent is extended or adjusted under 35 U.S.C. 154(b) by 0 days. days.

(21) Appl. No.: 14/404,078

(22) PCT Filed: Feb. 8, 2013

(86) PCT No.: PCT/JP2013/053084
§ 371 (c)(1),
(2) Date: Nov. 26, 2014

(87) PCT Pub. No.: WO2013/179691
PCT Pub. Date: Dec. 5, 2013

(65) Prior Publication Data
US 2015/0133605 A1    May 14, 2015

(30) Foreign Application Priority Data

May 28, 2012   (JP) ................. 2012-121205

(51) Int. Cl.
| | | |
|---|---|---|
| C08L 67/04 | (2006.01) |
| C08L 77/00 | (2006.01) |
| C08L 23/30 | (2006.01) |
| B60C 1/00 | (2006.01) |
| C08G 69/36 | (2006.01) |
| C08L 77/02 | (2006.01) |
| C08L 77/06 | (2006.01) |
| C08L 51/06 | (2006.01) |

(52) U.S. Cl.
CPC ............ *C08L 23/30* (2013.01); *B60C 1/0008* (2013.01); *C08G 69/36* (2013.01); *C08L 51/06* (2013.01); *C08L 77/02* (2013.01); *C08L 77/06* (2013.01); *C08L 2205/03* (2013.01)

(58) Field of Classification Search
CPC ......... B60C 1/0008; B60C 5/14; C08G 69/36; C08L 28/30; C08L 51/06; C08L 77/02; C08L 2205/03; C08L 77/06
See application file for complete search history.

(56) References Cited

U.S. PATENT DOCUMENTS

| | | |
|---|---|---|
| 6,024,816 A | 2/2000 | Yamakawa et al. |
| 2007/0178268 A1 | 8/2007 | Matsui et al. |
| 2010/0112257 A1 | 5/2010 | Morooka |
| 2011/0024015 A1 | 2/2011 | Takahashi et al. |
| 2011/0305863 A1 | 12/2011 | Morooka |
| 2013/0146194 A1 | 6/2013 | Kawaguchi |
| 2013/0156982 A1 | 6/2013 | Kawaguchi et al. |

FOREIGN PATENT DOCUMENTS

| | | | |
|---|---|---|---|
| EP | 0787755 A2 | 8/1997 | |
| EP | 2290003 A2 | 3/2011 | |
| EP | 2455423 A1 | 5/2012 | |
| JP | H0782317 A | 3/1995 | |
| JP | 08-216286 A | 8/1996 | |
| JP | 2004-506540 A | 3/2004 | |
| JP | 4217198 B2 | 1/2009 | |
| JP | 2010-132850 A | 6/2010 | |
| WO | WO-02/14410 A2 | 2/2002 | |
| WO | WO 2006/097656 * | 9/2006 | ............... C08F 8/14 |
| WO | WO-2009/123229 A1 | 10/2009 | |
| WO | WO-2012/026166 A1 | 3/2012 | |
| WO | WO-2012/035828 A1 | 3/2012 | |

OTHER PUBLICATIONS

Becquart et al (WO-2006/097656), Machine Translation.*
Jiang et al., "Synthesis and Characterization of Poly(ethylene-co-vinyl alcohol)-graft-poly(ε-caprolactone)", Polymer Journal, vol. 34, No. 9, pp. 682-686 (2002).

* cited by examiner

*Primary Examiner* — Jeffrey C Mullis
(74) *Attorney, Agent, or Firm* — Polsinelli PC

(57) ABSTRACT

Provided is a pneumatic tire which has low air permeability and undergoes a small change in air permeability due to fatigue. A pneumatic tire of the present invention contains a layer which is formed of a thermoplastic elastomer composition that is composed of (A) a modified ethylene-vinyl alcohol copolymer to which an aliphatic polyester is grafted, (B) a polyamide resin and (C) a modified rubber having an acid anhydride group or an epoxy group.

20 Claims, No Drawings

PNEUMATIC TIRE

RELATED APPLICATIONS

This application is a national stage application (under 35 U.S.C. § 371) of PCT/JP2013/053084, filed Feb. 8, 2013, which claims benefit of Japanese Application 2012-121205, filed May 28, 2012.

TECHNICAL FIELD

The present invention relates to a pneumatic tire. More specifically, the present invention relates to a pneumatic tire including a layer made of a thermoplastic elastomer composition.

BACKGROUND ART

Use of a thermoplastic elastomer composition obtained by dispersing a modified rubber in a polyamide resin as an inner liner of a pneumatic tire is known, and an attempt has been made to further incorporate an ethylene-vinyl alcohol copolymer in order to improve (to reduce) its air permeability (Patent Document 1).

On the other hand, although ethylene-vinyl alcohol copolymers are excellent in transparency, gas barrier properties, aroma retention, solvent resistance, oil resistance and the like, they have a poor heat drawability compared with polypropylene or polystyrene, making it difficult to use them in deep drawing, which has been problematic. Recently, however, an ethylene-vinyl alcohol copolymer has been developed, which has an improved heat drawability, is suitable for deep drawing, and contains a specific structural unit (Patent Document 2).

PRIOR ART DOCUMENTS

Patent Documents

Patent Document 1: Japanese Laid-open Patent Publication No. 2010-132850
Patent Document 2: Japanese Patent No. 4217198

SUMMARY OF THE INVENTION

Problems to be Solved by the Invention

The air permeability of a polyamide resin is improved (reduced) by the addition of an ethylene-vinyl alcohol copolymer. However, there is a problem that the air permeability of the ethylene-vinyl alcohol copolymer is increased due to repeated deformation (fatigue); i.e., the fatigue causes a change in air permeability. An object of the present invention is to provide a pneumatic tire including a layer made of a thermoplastic elastomer composition having a low air permeability and small rate of change in air permeability due to fatigue.

Means for Solving the Problems

The present inventors have found that the use of a modified ethylene-vinyl alcohol copolymer to which an aliphatic polyester(s) is/are grafted allows production of a thermoplastic elastomer composition having low air permeability and small rate of change in air permeability due to fatigue, thereby completing the present invention.

The present invention is a pneumatic tire including a layer made of a thermoplastic elastomer composition comprising a modified ethylene-vinyl alcohol copolymer (A) to which an aliphatic polyester(s) is/are grafted, a polyamide resin (B), and a modified rubber (C) containing an acid anhydride group or an epoxy group.

Preferably, the polyamide resin (B) is a modified polyamide resin ($B_1$) obtained by melt-blending 100 parts by weight of a polyamide resin ($B_0$) and from 0.05 to 5 parts by weight of a compound (D) capable of binding to a terminal amino group of a polyamide resin at a temperature of the melting point of the polyamide resin ($B_0$) or higher.

Preferably, the polyamide resin (B) or the polyamide resin ($B_0$) is at least one selected from the group consisting of Nylon 11, Nylon 12, Nylon 6, Nylon 66, Nylon 6/66 copolymer, Nylon 610, Nylon 612, and Nylon MXD6.

Preferably, the compound (D) capable of binding to a terminal amino group of a polyamide resin is a monofunctional epoxy compound.

Preferably, the modified rubber (C) is dynamically cross-linked by a cross-linking agent (E).

Preferably, the modified rubber (C) is an ethylene-α-olefin copolymer, ethylene-unsaturated carboxylic acid copolymer, or ethylene-unsaturated carboxylic acid ester copolymer, each containing an acid anhydride group or an epoxy group.

Preferably, the thermoplastic elastomer composition further includes an ethylene-vinyl alcohol copolymer ($A_0$) to which an aliphatic polyester is not grafted.

Preferably, the thermoplastic elastomer composition includes from 70 to 280 parts by weight of the modified rubber (C) with respect to 100 parts by weight of the total amount of the ethylene-vinyl alcohol copolymer and the polyamide resin (B).

Preferably, the amount of the polyamide resin (B) with respect to the total amount of the ethylene-vinyl alcohol copolymer and the polyamide resin (B) is from 5 to 80% by weight.

Effect of the Invention

The pneumatic tire of the present invention has low air permeability and a small rate of change in air permeability due to fatigue.

MODE FOR CARRYING OUT THE INVENTION

The present invention is a pneumatic tire including a layer made of a thermoplastic elastomer composition comprising a modified ethylene-vinyl alcohol copolymer (A) to which an aliphatic polyester(s) is/are grafted, a polyamide resin (B), and a modified rubber (C).

In the thermoplastic elastomer composition, the modified ethylene-vinyl alcohol copolymer (A) to which an aliphatic polyester(s) is/are grafted and the polyamide resin (B) form a matrix phase, and the modified rubber (C) forms a dispersed phase.

The modified ethylene-vinyl alcohol copolymer to which an aliphatic polyester(s) is/are grafted is a thermoplastic resin obtained by grafting an aliphatic polyester(s) to a hydroxyl group(s) of the ethylene-vinyl alcohol copolymer (hereinafter, referred to as "EVOH"), which copolymer is a saponified product of ethylene and a vinyl acetate copolymer.

The ratio of the content of the EVOH unit forming the stem of the modified ethylene-vinyl alcohol copolymer (A) to which an aliphatic polyester(s) is/are grafted, to the content of the aliphatic polyester unit grafted to the stem (the content of the EVOH unit/the content of the aliphatic polyester unit) is usually from 99/1 to 40/60 parts by weight, preferably, from 95/5 to 60/40 parts by weight, and particularly preferably, from 90/10 to 80/20 parts by weight. When the content of the EVOH unit is too low, the gas barrier properties tend to decrease. The ratio of the content of the EVOH unit to the content of the aliphatic polyester unit can be controlled by adjusting the ratio of the charged amount of the EVOH to the aliphatic polyester upon grafting reaction.

The modified ethylene-vinyl alcohol copolymer (A) to which an aliphatic polyester(s) is/are grafted can be produced using a known method in which an aliphatic polyester(s) is/are grafted to the EVOH forming the stem. In particular, a method in which lactones are subjected to ring-opening polymerization in the presence of EVOH is preferably used.

The lactones to be used in the above method are not particularly limited as long as they are lactones having from 3 to 10 carbon atoms. When such lactones have no substituent, they are represented by the following General Formula (1):

wherein n represents an integer of from 2 to 9, preferably, an integer of from 4 to 5.

Specific examples include β-propiolactone, γ-butyrolactone, ε-caprolactone, δ-valerolactone and the like. Among these, ε-caprolactone and δ-valerolactone are preferred, and ε-caprolactone is more preferred because of its cost-effective and easy availability.

Two or more types of these lactones can be used in combination.

Further, upon ring-opening polymerization reaction, addition of a known ring-opening polymerization catalyst, such as a titanium compound and a copper-tin compound, is preferred. Specific examples of the catalyst include titanium alkoxides such as tetra-n-butoxytitanium, tetraisobutoxytitanium, and tetraisopropoxytitanium; tin alkoxides such as dibutyldibutoxytin; and tin ester compounds such as dibutyltin diacetate. Among these, tetra-n-butoxytitanium is preferred because of its cost-effective and easy availability.

Examples of the method for subjecting lactones to ring-opening polymerization to achieve grafting to the EVOH include a method in which both materials are melt-kneaded in a kneader. Examples of the kneader used in the method include a single and twin screw extruder, Banbury mixer, kneader, Brabender and the like.

The time period and the temperature of melt-kneading are not particularly limited, and the temperature at which both materials melt, and the time period for the grafting to complete can be selected as appropriate. Usually, a range of from 10 seconds to 24 hours at a temperature of from 50 to 250° C., particularly, a range of from 5 minutes to 10 hours at a temperature of from 150 to 230° C. is preferably used.

The ethylene content of the EVOH used as the material is not particularly limited, and it is usually from 20 to 60% by mole, preferably, from 25 to 50% by mole, more preferably from 30 to 45% by mole. When the ethylene content is too high, the gas barrier properties tend to decrease. Conversely, when the ethylene content is too low, the reactivity with lactones in ring-opening polymerization tends to decrease.

The degree of saponification of EVOH is not particularly limited, and it is usually 80% by mole or more, preferably, from 90 to 99.99% by mole, particularly preferably from 99 to 99.9% by mole. When the degree of saponification is too low, the gas barrier properties tend to decrease.

The melt flow rate (MFR), which is used as an index of molecular weight of EVOH, is usually from 0.1 to 100 g/10 minutes, preferably from 0.5 to 50 g/10 minutes, and particularly preferably, from 1 to 25 g/10 minutes, at a temperature of 210° C. and a load of 2160 g. When the MFR value is too low, the reactivity with lactones in ring-opening polymerization tends to decrease.

As the EVOH, a mixture of two or more types of EVOHs having different ethylene contents, degrees of saponification and MFR values can be used, as long as the mixture is the combination of the EVOHs whose mean values satisfy the above described requirements.

The composition of the present invention may contain an ethylene-vinyl alcohol copolymer ($A_0$) to which an aliphatic polyester is not grafted, in addition to the modified ethylene-vinyl alcohol copolymer (A) to which an aliphatic polyester(s) is/are grafted. The ethylene-vinyl alcohol copolymer to which an aliphatic polyester is not grafted is hereinafter also referred to as "unmodified ethylene-vinyl alcohol copolymer".

When the unmodified ethylene-vinyl alcohol copolymer ($A_0$) is contained, the amount of the unmodified ethylene-vinyl alcohol copolymer ($A_0$) is 80% by weight or less, preferably from 20 to 70% by weight, and more preferably from 30 to 60% by weight, with respect to the total amount of the modified ethylene-vinyl alcohol copolymer (A) to which an aliphatic polyester(s) is/are grafted and the unmodified ethylene-vinyl alcohol copolymer ($A_0$). Too large an amount of the unmodified ethylene-vinyl alcohol copolymer ($A_0$) leads to an increase in the air permeability due to repeated deformation (fatigue).

The polyamide resin (B) used in the present invention is not particularly limited, and Nylon 11, Nylon 12, Nylon 6, Nylon 66, Nylon 6/66 copolymer, Nylon 610, Nylon 61.2, Nylon MXD6, Nylon 46 and Nylon 6T can be used alone or as a mixture. Among these, Nylon 6, Nylon 66, and Nylon 6/66 copolymer are preferred from the view point of satisfying both fatigue resistance and gas barrier properties.

The amount of the polyamide resin is preferably from 5 to 80% by weight, more preferably from 1.0 to 70% by weight, and still more preferably from 15 to 60% by weight with respect to the total amount of the ethylene-vinyl alcohol copolymer (A) and ($A_0$) and the polyamide resin (B). Too high an amount of the polyamide resin leads to a deterioration of workability, whereas too low an amount results in a deterioration of air permeability before fatigue.

The polyamide resin (B) may be a modified polyamide resin ($B_1$). The modified polyamide resin ($B_1$) refers to one which is obtained by melt-blending a polyamide resin ($B_0$) and a compound (D) capable of reacting with a terminal amino group of a polyamide resin. The compound (D) capable of reacting with a terminal amino group of a polyamide resin is hereinafter also referred to as an "amino group-reactive compound". Since the modified polyamide resin ($B_1$) has a small amount of terminal amino groups or does not have a terminal amino group, fluidity is maintained even when a large amount of a modified rubber (C) containing an acid anhydride group or an epoxy group is added, thereby facilitating production of a film.

Examples of the amino group-reactive compound (D) include mono-functional epoxy compounds, isocyanate group-containing compounds, acid anhydride group-containing compounds, and halogenated alkyl group-containing compounds. From the viewpoint of reactivity with a terminal amino group of the polyamide resin, preferred are mono-functional epoxy compounds.

Examples of the mono-functional epoxy compounds include ethylene oxide, epoxy propane, 1,2-epoxybutane, 2,3-epoxybutane, 3-methyl-1,2-epoxybutane, 1,2-epoxypentane, 4-methyl-1,2-epoxypentane, 2,3-epoxypentane, 3-methyl-1,2-epoxypentane, 4-methyl-1,2-epoxypentane, 4-methyl-2,3-epoxypentane, 3-ethyl-1,2-epoxypentane, 1,2-epoxyhexane, 2,3-epoxyhexane, 3,4-epoxyhexane, 5-methyl-1,2-epoxyhexane, 4-methyl-1,2-epoxyhexane, 5-methyl-1,2-epoxyhexane, 3-ethyl-1,2-epoxyhexane, 3-propyl-1,2-epoxyhexane, 4-ethyl-1,2-epoxyhexane, 5-methyl-1,2-epoxyhexane, 4-methyl-2,3-epoxyhexane, 4-ethyl-2,3-epoxyhexane, 2-methyl-3,4-epoxyhexane, 2,5-dimethyl-3,4-epoxyhexane, 2,5-dimethyl-3,4-epoxyhexane, 3-methyl-1,2-epoxyheptane, 4-methyl-1,2-epoxyheptane, 5-methyl-1,2-epoxyheptane, 6-methyl-1,2-epoxyheptane, 3-ethyl-1,2-epoxyheptane, 3-propy-1,2-epoxyheptane, 3-butyl-1,2-epoxyheptane, 4-propyl-2,3-epoxyheptane, 5-ethyl-1,2-epoxyheptane, 4-methyl-2,3-epoxyheptane, 4-ethyl-2,3-epoxyheptane, 4-propyl-2,3-epoxyheptane, 2-methyl-3,4-epoxyheptane, 5-methyl-3,4-epoxyheptane, 6-ethyl-3,4-epoxyheptane, 2,5-dimethyl-3,4-epoxyheptane, 2-methyl-5-ethyl-3,4-epoxyheptane, 1,2-epoxyheptane, 2,3-epoxyheptane, 3,4-epoxyheptane, 1,2-epoxyoctane, 2,3-epoxyoctane, 3,4-epoxyoctane, 4,5-epoxyoctane, 1,2-epoxynonane, 2,3-epoxynonane, 3,4-epoxynonane, 4,5-epoxynonane, 1,2-epoxydecane, 2,3-epoxydecane, 3,4-epoxydecane, 4,5-epoxydecane, 5,6-epoxydecane, 1,2-epoxyundecane, 2,3-epoxyundecane, 3,4-epoxyundecane, 5,6-epoxyundecane, 1,2-epoxydodecane, 2,3-epoxydodecane, 3,4-epoxydodecane, 4,5-epoxydodecane, 5,6-epoxydodecane, 6,7-epoxydodecane, epoxyethylbenzene, 1-phenyl-1,2-epoxypropane, 3-phenyl-1,2-epoxypropane, 1-phenyl-1,2-epoxybutane, 3-phenyl-1,2-epoxybutane, 4-phenyl-1,2-epoxybutane, 3-phenyl-1,2-epoxypentane, 4-phenyl-1,2-epoxypentane, 5-phenyl-1,2-epoxypentane, 1-phenyl-1,2-epoxyhexane, 3-phenyl-1,2-epoxyhexane, 4-phenyl-1,2-epoxyhexane, 5-phenyl-1,2-epoxyhexane, 6-phenyl-1,2-epoxyhexane, glycidol, 3,4-epoxy-1-butanol, 4,5-epoxy-1-pentanol, 5,6-epoxy-1-hexanol, 6,7-epoxy-1-heptanol, 7,8-epoxy-1-octanol, 8,9-epoxy-1-nonanol, 9,10-epoxy-1-decanol, 10,11-epoxy-1-undecanol, 3,4-epoxy-2-butanol, 2,3-epoxy-1-butanol, 3,4-epoxy-2-pentanol, 2,3-epoxy-1-pentanol, 1,2-epoxy-3-pentanol, 2,3-epoxy-4-methyl-1-pentanol, 2,3-epoxy-4,4-dimethyl-1-pentanol, 2,3-epoxy-1-hexanol, 3,4-epoxy-2-hexanol, 4,5-epoxy-3-hexanol, 1,2-epoxy-3-hexanol, 2,3-epoxy-4-methyl-1-hexanol, 2,3-epoxy-4-ethyl-1-hexanol, 2,3-epoxy-4,4-dimethyl-1-hexanol, 2,3-epoxy-4,4-diethyl-1-hexanol, 2,3-epoxy-4-methyl-1-hexanol, 3,4-epoxy-5-methyl-2-hexanol, 3,4-epoxy-5,5-dimethyl-2-hexanol, 3,4-epoxy-3-heptanol, 2,3-epoxy-1-heptanol, 4,5-epoxy-3-heptanol, 2,3-epoxy-4-heptanol, 1,2-epoxy-3-heptanol, 2,3-epoxy-1-octanol, 3,4-epoxy-3-octanol, 4,5-epoxy-3-octanol, 5,6-epoxy-4-octanol, 2,3-epoxy-4-octanol, 1,2-epoxy-3-octanol, 2,3-epoxy-1-nonanol, 3,4-epoxy-2-nonanol, 4,5-epoxy-3-nonanol, 5,6-epoxy-5-nonanol, 3,4-epoxy-5-nonanol, 2,3-epoxy-4-nonanol, 1,2-epoxy-3-nonanol, 2,3-epoxy-1-decanol, 3,4-epoxy-2-decanol, 4,5-epoxy-3-decanol, 5,6-epoxy-4-decanol, 6,7-epoxy-5-decanol, 3,4-epoxy-5-decanol, 2,3-epoxy-4-decanol, 1,2-epoxy-3-decanol, 1,2-epoxycyclopentane, 1,2-epoxycyclohexane, 1,2-epoxycycloheptane, 1,2-epoxycyclooctane, 1,2-epoxycyclononane, 1,2-epoxycyclodecane, 1,2-epoxycyclododecane, 3,4-epoxycyclopentene, 3,4-epoxycyclohexene, 3,4-epoxycycloheptene, 3,4-epoxycyclooctane, 3,4-epoxycyclononene, 1,2-epoxycyclodecene, 1,2-epoxycycloundecane, 1,2-epoxycyclododecane, i-butoxy-2,3-epoxypropane, 1-allyloxy-2,3-epoxypropane, polyethylene glycol butyl glycidyl ether, 2-ethylhexyl glycidyl ether, phenyl glycidyl ether and p-sec-butylphenyl glycidyl ether. From the viewpoint of the compatibility of the polyamide resin, particularly preferred are epoxy compounds having from 3 to 20 carbon atoms, and preferably from 3 to 13 carbon atoms, and having ether and/or a hydroxyl group.

As the polyamide resin ($B_0$), polyamide resins described as those which can be used as the above mentioned polyamide resin (B) can be used.

Although the method of melt-blending the polyamide resin ($B_0$) and the amino group-reactive compound (D) is not particularly limited, for example, a polyamide resin ($B_0$) and an amino group-reactive compound (D) are fed into a twin screw kneader and melt-kneaded at a temperature of the melting point of the polyamide resin ($B_0$), preferably at a temperature 20° C. higher than the melting point, for example, 240° C. Time period of melt-kneading is, for example, from 1 to 10 minutes, preferably, from 2 to 5 minutes.

The amount of the amino group-reactive compound (D) which is used for modifying the polyamide resin ($B_0$) is from 0.05 to 5 parts by weight with respect to 100 parts by weight of the polyamide resin ($B_0$), and preferably from 1 to 3 parts by weight with respect thereto. Too small an amount of the amino group-reactive compound (D) is not preferred, because it results in a small fluidity-improving effect when a large amount of the modified rubber is added. Conversely, too large an amount is not preferred, because it leads to a deterioration of the low-temperature durability (repeated fatigability) of the polyamide resin.

The modified rubber (C) used in the present invention is a rubber containing an acid anhydride group or an epoxy group, obtained by introducing an acid anhydride group or an epoxy group to the rubber. From the viewpoint of the compatibility with the polyamide resin, the modified rubber (C) is particularly preferably a rubber containing an acid anhydride group.

The rubber constituting the modified rubber (C) is not particularly limited, and examples thereof include ethylene-α-olefin copolymer, ethylene-unsaturated carboxylic acid copolymer, and ethylene-unsaturated carboxylic acid ester copolymer. In another words, the modified rubber (C) is preferably an ethylene-α-olefin copolymer, ethylene-unsaturated carboxylic acid copolymer, or ethylene-unsaturated carboxylic acid ester copolymer, each containing an acid anhydride group or an epoxy group. Examples of the ethylene-α-olefin copolymer include ethylene-propylene copolymer, ethylene-butene copolymer, ethylene-hexene copolymer, and ethylene-octene copolymer. Examples of the ethylene-unsaturated carboxylic acid copolymer include ethylene-acrylate copolymer, and ethylene-methacrylate copolymer. Examples of the ethylene-unsaturated carboxylic acid ester copolymer include ethylene-methyl acrylate copolymer, ethylene-methyl methacrylate copolymer, ethylene-ethyl acrylate copolymer, and ethylene-ethyl methacrylate copolymer.

The modified rubber containing an acid anhydride group can be produced, for example, by reacting an acid anhydride and peroxide with rubber. The content of the acid anhydride group in the modified rubber containing an acid anhydride group is preferably from 0.01 to 1 mol/kg, and more preferably, from 0.05 to 0.5 mol/kg. Too low a content of the acid anhydride group causes the dispersion of the modified rubber to deteriorate, whereas too large a content results in a deterioration of the processability. The modified rubber containing an acid anhydride group is available on the market, and its commercially available product can be used. Examples of the commercially available product of the modified rubber include a maleic anhydride modified ethylene-propylene copolymer (TAFMER (registered trademark) MP-0620) and a maleic anhydride modified ethylene-butene copolymer (TAFMER (registered trademark) MP-7020), manufactured by Mitsui Chemicals, Inc.

The modified rubber containing an epoxy group can be produced, for example, by copolymerization of glycidyl methacrylate with rubber. Although the copolymerization ratio is not limited, for example, the amount of glycidyl methacrylate with respect to 100 parts by weight of rubber is from 10 to 50 parts by weight. The content of the epoxy group in the modified rubber containing an epoxy group is preferably from 0.01 to 5 mol/kg, and more preferably from 0.1 to 1.5 mol/kg. Too small a content of the epoxy group causes the dispersion of the modified rubber to deteriorate, whereas too large a content results in a deterioration of processability. The modified rubber containing an epoxy group is available on the market, and its commercially available product can be used. Examples of the commercially available product of the modified rubber include an epoxy modified ethylene-methyl acrylate copolymer (ESPRENE (registered trademark) EMA2752) manufactured by Sumitomo Chemical Co., Ltd.

A particularly preferred modified rubber is an ethylene-α-olefin copolymer which is graft-modified by an acid anhydride group. Examples thereof include the above described maleic anhydride modified ethylene-propylene copolymer (TAFMER (registered trademark) (MP-0620) and the maleic anhydride modified ethylene-butene copolymer (TAFMER (registered trademark) (MP-7020), manufactured by Mitsui Chemicals, Inc.

The amount of the modified rubber (C) in the thermoplastic elastomer composition is preferably from 70 to 280 parts by weight, more preferably from 80 to 240 parts by weight, and still more preferably from 90 to 220 parts by weight with respect to 100 parts by weight of the total amount of the ethylene-vinyl alcohol copolymer and the polyamide resin. Too small an amount of the modified rubber (C) results in a poor low-temperature durability, whereas too large an amount leads to a decrease in the fluidity upon melting, resulting in a deterioration of the film formability.

The modified rubber (C) is preferably dynamically cross-linked by a cross-linking agent (E). Dynamic cross-linking allows the dispersion state of the modified rubber (C) in the thermoplastic elastomer composition to be fixed.

Examples of the cross-linking agent (E) include a hydrogen-bonding compound having a functional group which reacts with an acid anhydride group or an epoxy group in the modified rubber (C) and a functional group which can form a hydrogen bond with an amide bond or a hydroxyl group. Examples of the hydrogen-bonding compound having a functional group which reacts with an acid anhydride group or an epoxy group and a functional group which can form a hydrogen bond with an amide bond or a hydroxyl group include a compound which contains as a functional group reacting with an acid anhydride group or an epoxy group, an amino group, a hydroxyl group, a carboxyl group, or a mercapto group, and which contains, as a functional group which can form a hydrogen bond with an amide bond or a hydroxyl group, a sulfone group, a carbonyl group, an ether linkage, a hydroxyl group, or a nitrogen-containing heterocyclic. Among others, a compound which contains, as a functional group reacting with an acid anhydride group or an epoxy group, an amino group and/or hydroxyl group, and which contains, as a functional group which can form a hydrogen bond with an amide bond or a hydroxyl group, a sulfone group, carbonyl group and/or nitrogen-containing heterocyclic is preferred. Examples of the compound which contains, as a functional group reacting with an acid anhydride group or an epoxy group, an amino group and/or hydroxyl group, and which contains, as a functional group which can form a hydrogen bond with an amide bond or a hydroxyl group, a sulfone group, carbonyl group and/or nitrogen-containing heterocyclic include 3,3'-diaminodiphenyl sulfone, 4,4'-diaminodiphenyl sulfone, 1,3-bis(3-aminophenoxy) benzene, 3,3'-diamino-4,4'-dihydroxydiphenyl sulfone, (4-(4-aminobenzoyl)oxyphenyl) 4-aminobenzoate, 3-amino-1,2,4-triazole, and tris(2-hydroxyethyl)isocyanurate. Among others, 3,3'-diaminodiphenyl sulfone, tris(2-hydroxyethyl)isocyanurate, and 3-amino-1,2,4-triazole are preferred from the viewpoint of improving the cost, safety, and low-temperature durability.

The amount of the cross-linking agent (E) is preferably from 0.1 to 2 parts by weight, and more preferably from 0.5 to 1 part by weight with respect to 100 parts by weight of the modified rubber (C). When the amount of the cross-linking agent is too small, the dynamic cross-linking becomes insufficient and fine dispersion of the modified rubber (C) may not be maintained, thereby reducing the durability and gas barrier properties. Conversely, when the amount of the cross-linking agent is too small, the durability is reduced, which is not preferred.

Dynamic cross-linking can be performed by melt-blending the modified rubber (C) with the cross-linking agent (E). Although the temperature of melt-blending is usually a temperature of the melting point of the polyamide resin (B) or higher, the temperature is preferably a temperature 20° C. higher than the melting point of the polyamide resin (B), for example, from 190 to 290° C. For example, when a polyamide resin whose melting point is 225° C. is used, the temperature is preferably from 245 to 265° C. The time period of melt-blending is usually from 1 to 10 minutes, and preferably from 2 to 5 minutes. The shear rate during kneading is preferably from 1000 to 8000 sec$^{-1}$, more preferably from 1000 to 5000 sec$^{-1}$.

The thermoplastic elastomer composition can be produced by melt-blending a polyamide resin or a modified polyamide resin, an ethylene-vinyl alcohol copolymer and a modified rubber at a temperature higher than the melting point of the polyamide resin or the modified polyamide resin, preferably at a temperature 20° C. higher than the melting point of the polyamide resin or the modified polyamide resin, for example, at 230° C.

The modified rubber does not need to be dynamically cross-linked in advance, before being melt-blended with a polyamide resin or a modified polyamide resin and an ethylene-vinyl alcohol copolymer. By adding a cross-linking agent when the polyamide resin or modified polyamide resin, ethylene-vinyl alcohol copolymer and modified rubber are melt-blended, the dynamic cross-linking of the modified rubber can be performed simultaneously with the melt-blending of the polyamide resin or modified polyamide resin, ethylene-vinyl alcohol copolymer and modified rubber. In another words, by melt-blending the polyamide resin or modified polyamide resin, ethylene-vinyl alcohol copolymer and modified rubber and a cross-linking agent, a thermoplastic elastomer composition in which the modified rubber is dynamically cross-linked is obtained.

To the thermoplastic elastomer composition, in addition to the above described components, various kinds of additives commonly added in resin and rubber compositions can be added, including a reinforcing agent (filler) such as carbon black or silica, a vulcanizing agent or a cross-linking agent, a vulcanization accelerator or a cross-linking accelerator, a plasticizer, various kinds of oils and an aging preventing agent. Such additives can be kneaded with the compositions in a common method, to be used for vulcanization or cross-linking. The amounts of these additives to be added can be set to conventionally common additive amounts as long as the amounts thereof do not depart from the intended purpose of the invention.

The thermoplastic elastomer composition can be formed into a film using a T-die equipped extruder, an inflation molding apparatus, or the like. Since the film has low air permeability, the film can be suitably used as an inner liner of a pneumatic tire.

The pneumatic tire of the present invention is a pneumatic tire including a layer made of the above described thermoplastic elastomer composition. The tire can be produced by a conventional method. For example, the thermoplastic elastomer composition is extruded in advance into a film form having a predetermined width and a predetermined thickness, which is then attached onto a tire molding drum in a cylindrical form. Thereon, material members used in usual tire production are sequentially attached and laminated, such as a carcass layer, a belt layer, and a tread layer made of unvulcanized rubber, and then the drum is pulled out to obtain a green tire. The green tire is then subjected to heat vulcanization by a usual method to produce a desired pneumatic tire.

EXAMPLES (1) Raw Materials

Raw materials used in Examples and Comparative Examples are as follows.

As the ethylene-vinyl alcohol copolymer, the following four types were used.

EVOH-1: Modified ethylene-vinyl alcohol copolymer to which an aliphatic polyester(s) is/are grafted (EVOH/ε-caprolactone=83% by weight/17% by weight). The EVOH-1 was obtained by charging 100 parts by weight of EVOH having an ethylene content of 32% by mole, a degree of saponification of 99.6%, and a MFR of 12 g/10 minutes (210° C., a load of 2160 g), 20 parts by weight of ε-caprolactone, and 0.2 parts by weight of tetra-n-butoxytitanium into a kneader, and by reacting the resultant for 6 hours at 220° C.

EVOH-2: Modified ethylene-vinyl alcohol copolymer 1.0 to which an aliphatic polyester(s) is/are grafted (EVOH/ε-caprolactone=83% by weight/17% by weight). The EVOH-2 was obtained by charging 100 parts by weight of EVOH having an ethylene content of 44% by mole, a degree of saponification of 99.6% by mole, and a MFR of 12 g/10 minutes (210° C., a load of 2160 g), 20 parts by weight of ε-caprolactone, and 0.2 parts by weight of tetra-n-butoxytitanium into a kneader, and by reacting the resultant for 6 hours at 220° C.

EVOH-3: Unmodified ethylene-vinyl alcohol copolymer having ethylene content of 48% by mole, a degree of saponification of 99.7% by mole, and a MFR of 15 g/1.0 minutes (210° C., a load of 2160 g)

EVOH-4: Unmodified ethylene-vinyl alcohol copolymer having an ethylene content of 29% by mole, a degree of saponification of 99.6% by mole, and a MFR of 8.0 g/10 minutes (210° C., a load of 2160 g)

As the polyamide resin, the following two types were used.

Nylon 6/66: Nylon 6/66 copolymer "UBE Nylon" 5023B manufactured by Ube Industries, Ltd.

Nylon 6: Nylon 6 "UBE Nylon" 1022B manufactured by Ube Industries, Ltd.

As the compound capable of binding to a terminal amino group of a polyamide resin, p-sec-butylphenyl glycidyl ether (Epiol (registered trademark) SB manufactured by NOF Corporation) was used.

As the modified rubber, the following two types were used.

Modified rubber-1: Maleic anhydride modified ethylene-butene copolymer (TAFMER (registered trademark) MH7020 manufactured by Mitsui Chemicals, Inc.

Modified rubber-2: Maleic anhydride modified ethylene-propylene copolymer (TAFMER (registered trademark) MP0620 manufactured by Mitsui Chemicals, Inc.

As the cross-linking agent, tris(2-hydroxyethyl)isocyanurate (THEIC A manufactured by SHIKOKU CHEMICALS CORPORATION) was used.

(2) Preparation of Modified Polyamide Resin

Into a cylinder, 100 parts by weight of Nylon 6/66 and 2 parts by weight of p-sec-butylphenyl glycidyl ether were introduced from a raw material supply port of a twin screw kneading extruder (manufactured by The Japan Steel Works, Ltd.), and transferred to a kneading zone where the temperature was set to 230° C. and the residence time was set to about five minutes, to be melt-kneaded. Then the melt-kneaded product was extruded from a die attached to a discharge port in a strand shape. The obtained strand extrudate was pelletized using a resin pelletizer to obtain a pellet-shaped modified polyamide resin-1.

Into a cylinder, 100 parts by weight of Nylon 6 and 2 parts by weight of p-sec-butylphenyl glycidyl ether were introduced from a raw material supply port of a twin screw kneading extruder (manufactured by The Japan Steel Works, Ltd.), and transferred to a kneading zone where the temperature was set to 240° C. and the residence time was set to about five minutes, to be melt-kneaded. Then the melt-kneaded product was extruded from a die attached to a discharge port in a strand shape. The obtained strand extrudate was pelletized using a resin pelletizer to obtain a pellet-shaped modified polyamide resin-2.

(3) Preparation of Thermoplastic Elastomer Composition

A polyamide resin or a modified polyamide resin, an ethylene-vinyl alcohol copolymer, a modified rubber and a cross-linking agent were introduced into a cylinder at a weight ratio listed in Table 2 from a raw material supply port of a twin screw kneading extruder (manufactured by The Japan Steel Works, Ltd.), and transferred to a kneading zone where the temperature was set to 230° C. and the residence time was set to about two to eight minutes, to be melt-blended. Then, the melt-blended product was extruded from a die attached to a discharge port in a strand shape. The obtained strand extrudate was pelletized using a resin pelletizer to obtain a pellet-shaped thermoplastic elastomer composition.

(4) Evaluation Method of Thermoplastic Elastomer Composition

The obtained thermoplastic elastomer composition was evaluated for air permeability, rate of change in air permeability after fatigue, and tire air leakage by the following testing method.

(a) Air Permeability

The pellet-shaped thermoplastic elastomer composition was formed into a sheet with an average thickness of 0.10 mm by using a 550 mm width T-die equipped 40 mm φ single screw extruder (manufactured by Pla Giken Co., Ltd.) under extrusion conditions of extrusion temperatures: C1/C2/C3/C4/die=210/220/225/230/230° C., a cooling roll temperature of 50° C., and take-up speed of 3 m/min. A test piece having a length of 20 cm and a width of 20 cm was then produced from this film, and dried at 150° C. for three hours or more, and the air permeability of the thermoplastic elastomer composition film was measured using air as a test gas at a test temperature of 55° C. in accordance with JIS K7126-1 "Determination method of gas permeability of plastic film and sheet (differential pressure method)".

Incidentally, in the following Table 2, the air permeability is indicated in "$10^{-12}$ cc·cm/cm$^2$·sec·cmHg" unit, and $1 \times 10^{-12}$ cc·cm/cm$^2$·cmHg can be converted to $7.5 \times 10^{-8}$ mm$^3$·mm/mm$^2$·sec MPa.

(b) Rate of change in Air Permeability after Fatigue

Of the ingredients listed in Table 1, materials other than the vulcanizing agent were kneaded in a 1.7-liter Banbury mixer at a set temperature of 70° C. for five minutes to obtain a master batch, which was then kneaded with the vulcanizing agent using an 8-inch roll to form a film having a thickness of 0.7 mm. The obtained unvulcanized rubber composition film was laminated with a thermoplastic elastomer composition film which was produced in a similar manner to the testing method in the above "(a) Air permeability", and vulcanized at 170° C. for 15 minutes. From the obtained laminate, a test piece having a length of 11 cm and a width of 11 cm was produced, and the air permeability thereof was measured in a similar manner to the testing method in the above "(a) Air permeability". After measuring the air permeability, the test piece was fatigued by extending and contracting repeatedly for one million times at room temperature at an elongation rate of 20% and at 400 times per min. The air permeability of the test piece after the fatigue was measured in a similar manner to the testing method in the above "(a) Air permeability", to be denoted as the "air permeability after fatigue". The ratio of the air permeability after fatigue to the air permeability before fatigue is defined as the "rate of change in air permeability after fatigue". When the rate of change in air permeability after fatigue is 1.30 or lower, the composition is considered to have an effect of inhibiting the deterioration of the air permeability.

TABLE 1

Ingredients of unvulcanized rubber composition

| Raw material | Amount (Parts by weight) |
|---|---|
| Halogenated butyl rubber[1] | 100 |
| GPF carbon black[2] | 30 |
| Wet silica[3] | 20 |
| Aroma oil [4] | 7.5 |
| Zinc flower[5] | 3 |
| Stearic acid[6] | 1 |
| Sulfur[7] | 1 |
| Vulcanization accelerator[8] | 1.5 |
| Total | 164 |

Footnote:
[1]BROMOBUTYL X2, manufactured by LANXESS Rubber Corporation
[2]HTC#G, manufactured by NSCC Carbon Co., Ltd.
[3]Zeosil (Registered trademark) 165GR, manufactured by Rhodia Corporation
[4] Extract 4S, manufactured by SHOWA SHELL SEKIYU K. K.
[5]Zinc oxide #3, manufactured by SEIDO CHEMICAL INDUSTRY CO., LTD.
[6]Beads Stearic Acid YR, manufactured by NOF Corporation
[7]"GOLDEN FLOWER" SULFUR POWDER, 150 mesh, manufactured by Tsurumi Chemical Industry Co., Ltd.
[8]Nocceller DM, manufactured by OUCHI SHINKO CHEMICAL INDUSTRIAL CO., LTD.

(c) Tire Air Leakage

The thermoplastic elastomer composition was formed into a film having a thickness of 60 μm, and a radial tire-195/65R15 was manufactured in a conventional manner, using the film as an inner liner. The manufactured tire was left to stand at an air pressure of 250 kPa, in an environment of 21° C. for three months to measure the change in the tire air pressure. The amount of decrease in the tire air pressure per one month represented in % is referred to as "tire air leakage" (%/month). The tire air leakage was also measured after the manufactured tire was filled with air at a pressure of 140 kPa by using a standard rim defined by JATMA standards in a room, and allowed to travel at room temperature of 38° C., at a load of 300 kN, at a speed of 80 km/h for a distance of 70,000 km on a drum with an external diameter of 1700 mm. The tire air leakage before travelling is referred to as the "tire air leakage before fatigue", and the tire air leakage after travelling is referred to as the "tire air leakage after fatigue". The ratio of the tire air leakage after fatigue to the tire air leakage before fatigue is referred to as "rate of change in tire air leakage due to fatigue". When the rate of change in tire air leakage due to fatigue is 1.25 times or smaller, the composition is considered to have an effect of inhibiting the deterioration of the air leakage due to fatigue.

(5) Evaluation Result

The evaluation results are presented in Table 2.

TABLE 2

| | | Example 1 | Example 2 | Example 3 | Example 4 | Example 5 | Example 6 | Comparative Example 1 | Comparative Example 2 |
|---|---|---|---|---|---|---|---|---|---|
| EVOH-1 | Parts by weight | 79.8 | | 79.8 | | 79.8 | 79.8 | | |
| EVOH-2 | Parts by weight | | 59.6 | | 79.8 | | | | |
| EVOH-3 | Parts by weight | | | | | | | 79.8 | |
| EVOH-4 | Parts by weight | | | | | | | | 59.6 |
| Nylon 6/66 | Parts by weight | 20.2 | | | | | | | |
| Nylon 6 | Parts by weight | | 40.4 | | | | | | |
| Modified polyamide resin-1 | Parts by weight | | | 20.2 | 20.2 | | 20.2 | 20.2 | 40.4 |

TABLE 2-continued

|  |  | Example 1 | Example 2 | Example 3 | Example 4 | Example 5 | Example 6 | Comparative Example 1 | Comparative Example 2 |
|---|---|---|---|---|---|---|---|---|---|
| Modified polyamide resin-2 | Parts by weight |  |  |  |  | 20.2 |  |  |  |
| Modified rubber-1 | Parts by weight | 116.2 | 116.2 | 116.2 | 116.2 | 116.2 |  | 116.2 | 116.2 |
| Modified rubber-2 | Parts by weight |  |  |  |  |  | 115.8 |  |  |
| Cross-linking agent | Parts by weight | 1.74 | 1.74 | 1.74 | 1.74 | 1.74 | 1.74 | 1.74 | 1.74 |
| Total | Parts by weight | 217.9 | 217.9 | 217.9 | 217.9 | 217.9 | 217.5 | 217.9 | 217.9 |
| Air permeability before fatigue (55° C.) | $10^{-12}$ cc · cm/ cm² · Sec · cmHg | 8.9 | 16.9 | 8.8 | 12.2 | 8.7 | 8.8 | 9.0 | 7.5 |
| Air permeability after fatigue (55° C.) | $10^{-12}$ cc · cm/ cm² · Sec · cmHg | 9.0 | 17.0 | 9.0 | 12.2 | 9.0 | 9.2 | 13.6 | 14.8 |
| Rate of change in air permeability after fatigue |  | 1.01 | 1.01 | 1.02 | 1.00 | 1.03 | 1.05 | 1.51 | 1.97 |
| Tire air leakage before fatigue | %/month | 0.90 | 1.18 | 0.89 | 1.10 | 0.88 | 0.87 | 0.94 | 0.81 |
| Tire air leakage after fatigue | %/month | 0.91 | 1.19 | 0.91 | 1.11 | 0.92 | 0.94 | 1.19 | 1.25 |
| Rate of change in tire air leakage |  | 1.01 | 1.01 | 1.02 | 1.01 | 1.05 | 1.08 | 1.27 | 1.54 |

INDUSTRIAL APPLICABILITY

The pneumatic tire of the present invention can be suitably used as a tire for an automobile and the like.

The invention claimed is:

1. A pneumatic tire comprising a layer made of a thermoplastic elastomer composition comprising a modified ethylene-vinyl alcohol copolymer (A) wherein said modified ethylene-vinyl alcohol copolymer (A) is an ethylene-vinyl alcohol copolymer to which at least one aliphatic polyester is grafted, a polyamide resin (B), and a modified rubber (C) wherein said modified rubber (C) is a rubber containing an acid anhydride group or an epoxy group, wherein the ratio of the content of the ethylene-vinyl alcohol unit forming the stem of the modified ethylene-vinyl alcohol copolymer to which at least one aliphatic polyester is grafted to the content of the aliphatic polyester unit grafted to the stem is 95/5 to 60/40 parts by weight, and wherein the rate of change in the air leakage due to fatigue is 1.08 or smaller.

2. The pneumatic tire according to claim 1, wherein the polyamide resin (B) is a modified polyamide resin ($B_1$) obtained by melt-blending 100 parts by weight of a polyamide resin ($B_0$) and from 0.05 to 5 parts by weight of a compound (D) capable of binding to a terminal amino group of a polyamide resin at a temperature of the melting point of the polyamide resin ($B_0$) or higher; wherein said compound (D) is at least one member selected from the group consisting of a mono-epoxy compound, an isocyanate group-containing compound, an acid anhydride group-containing compound, and a halogenated alkyl group-containing compound.

3. The pneumatic tire according to claim 1 optionally containing a polyamide resin ($B_0$), wherein the polyamide resin (B) or the polyamide resin ($B_0$) is at least one member selected from the group consisting of Nylon 11, Nylon 12, Nylon 6, Nylon 66, Nylon 6/66 copolymer, Nylon 610, Nylon 612, and Nylon MXD6.

4. The pneumatic tire according to claim 2, wherein the compound (D) capable of binding to a terminal amino group of a polyamide resin is a mono-epoxy compound.

5. The pneumatic tire according to claim 1, wherein the modified rubber (C) is dynamically cross-linked by a cross-linking agent (E), wherein the cross-linking agent (E) is a hydrogen-bonding compound having a functional group which reacts with an acid anhydride group or an epoxy group in the modified rubber (C) and a functional group which can form a hydrogen bond with an amide bond or a hydroxyl group.

6. The pneumatic tire according to claim 1, wherein the modified rubber (C) is an ethylene-α-olefin copolymer, ethylene-unsaturated carboxylic acid copolymer, or ethylene-unsaturated carboxylic acid ester copolymer, each containing an acid anhydride group or an epoxy group.

7. The pneumatic tire according to claim 1, wherein the thermoplastic elastomer composition further comprises an ethylene-vinyl alcohol copolymer ($A_0$) to which an aliphatic polyester is not grafted.

8. The pneumatic tire according to claim 1, wherein the thermoplastic elastomer composition comprises from 70 to 280 parts by weight of the modified rubber (C) with respect to 100 parts by weight of the total amount of the modified ethylene-vinyl alcohol copolymer and the polyamide resin (B).

9. The pneumatic tire according to claim 1, wherein the amount of the polyamide resin (B) with respect to the total amount of the modified ethylene-vinyl alcohol copolymer and the polyamide resin (B) is from 5 to 80% by weight.

10. The pneumatic tire according to claim 2, wherein the polyamide resin (B) or the polyamide resin ($B_0$) is at least one selected from the group consisting of Nylon 11, Nylon 12, Nylon 6, Nylon 66, Nylon 6/66 copolymer, Nylon 610, Nylon 612, and Nylon MXD6.

11. The pneumatic tire according to claim 3, wherein the compound (D) capable of binding to a terminal amino group of a polyamide resin is a mono-functional epoxy compound.

12. The pneumatic tire according to claim 2, wherein the modified rubber (C) is dynamically cross-linked by a cross-linking agent (E), wherein the cross-linking agent (E) is a hydrogen-bonding compound having a functional group which reacts with an acid anhydride group or an epoxy group in the modified rubber (C) and a functional group which can form a hydrogen bond with an amide bond or a hydroxyl group.

13. The pneumatic tire according to claim 3, wherein the modified rubber (C) is dynamically cross-linked by a cross-linking agent (E), wherein the cross-linking agent (E) is a hydrogen-bonding compound having a functional group which reacts with an acid anhydride group or an epoxy group in the modified rubber (C) and a functional group which can form a hydrogen bond with an amide bond or a hydroxyl group.

14. The pneumatic tire according to claim 4, wherein the modified rubber (C) is dynamically cross-linked by a cross-linking agent (E), wherein the cross-linking agent (E) is a hydrogen-bonding compound having a functional group which reacts with an acid anhydride group or an epoxy group in the modified rubber (C) and a functional group which can form a hydrogen bond with an amide bond or a hydroxyl group.

15. The pneumatic tire according to claim 2, wherein the modified rubber (C) is an ethylene-α-olefin copolymer, ethylene-unsaturated carboxylic acid copolymer, or ethylene-unsaturated carboxylic acid ester copolymer, each containing an acid anhydride group or an epoxy group.

16. The pneumatic tire according to claim 3, wherein the modified rubber (C) is an ethylene-α-olefin copolymer, ethylene-unsaturated carboxylic acid copolymer, or ethylene-unsaturated carboxylic acid ester copolymer, each containing an acid anhydride group or an epoxy group.

17. The pneumatic tire according to claim 4, wherein the modified rubber (C) is an ethylene-α-olefin copolymer, ethylene-unsaturated carboxylic acid copolymer, or ethylene-unsaturated carboxylic acid ester copolymer, each containing an acid anhydride group or an epoxy group.

18. The pneumatic tire according to claim 5, wherein the modified rubber (C) is an ethylene-α-olefin copolymer, ethylene-unsaturated carboxylic acid copolymer, or ethylene-unsaturated carboxylic acid ester copolymer, each containing an acid anhydride group or an epoxy group.

19. The pneumatic tire according to claim 2, wherein the thermoplastic elastomer composition further comprises an ethylene-vinyl alcohol copolymer ($A_0$) to which an aliphatic polyester is not grafted.

20. The pneumatic tire according to claim 3, wherein the thermoplastic elastomer composition further comprises an ethylene-vinyl alcohol copolymer ($A_0$) to which an aliphatic polyester is not grafted.

* * * * *